(12) United States Patent
Keithley

(10) Patent No.: US 8,001,040 B2
(45) Date of Patent: Aug. 16, 2011

(54) COMPUTER-IMPLEMENTED METHOD AND SYSTEM FOR DYNAMIC CONSUMER RATING IN A TRANSACTION

(75) Inventor: Thomas H. Keithley, Monkton, MD (US)

(73) Assignee: eBay Inc., San Jose, CA (US)

( * ) Notice: Subject to any disclaimer, the term of this patent is extended or adjusted under 35 U.S.C. 154(b) by 551 days.

(21) Appl. No.: 11/813,708

(22) PCT Filed: Jan. 25, 2005

(86) PCT No.: PCT/US2005/002400
§ 371 (c)(1),
(2), (4) Date: Jan. 9, 2008

(87) PCT Pub. No.: WO2006/080914
PCT Pub. Date: Aug. 3, 2006

(65) Prior Publication Data
US 2008/0195528 A1    Aug. 14, 2008

(51) Int. Cl.
*G06Q 40/00* (2006.01)
(52) U.S. Cl. .......................................... 705/38; 705/35
(58) Field of Classification Search .................. 705/36, 705/36 R, 37, 38
See application file for complete search history.

(56) References Cited

U.S. PATENT DOCUMENTS

| | | | |
|---|---|---|---|
| 3,920,908 A | 11/1975 | Kraus | |
| 4,191,860 A | 3/1980 | Weber | |
| 4,291,198 A | 9/1981 | Anderson et al. | |
| 4,757,267 A | 7/1988 | Riskin | |
| 4,969,183 A | 11/1990 | Reese | |
| 4,996,705 A | 2/1991 | Entenmann et al. | |
| 5,010,238 A | 4/1991 | Kadono et al. | |
| 5,012,077 A | 4/1991 | Takano | |
| 5,120,945 A | 6/1992 | Nishibe et al. | |
| 5,329,589 A | 7/1994 | Fraser et al. | |
| 5,446,885 A | 8/1995 | Moore et al. | |

(Continued)

FOREIGN PATENT DOCUMENTS

EP    0 338 568 A2    10/1989
(Continued)

OTHER PUBLICATIONS

Dun and Bradstreet: On-line Dun & Bradstreet helps businesses break family ties on new 'do-business' website M2 Presswire. Coventry: Jul. 17, 2000. p. 1.*

(Continued)

*Primary Examiner* — Lalita Hamilton
(74) *Attorney, Agent, or Firm* — Haynes & Boone, LLP.

(57) ABSTRACT

Disclosed is a computer-implemented method (100) of rating a consumer in connection with a transaction initiated by the consumer and requesting credit from a credit issuer (28). The method (100) includes the steps of: providing a merchant-based consumer/transaction data set (16) to a central credit issuer database (20); providing a third party credit history data set (24) to the central credit issuer database (20); providing a credit issuer credit history data set (30) to the central credit issuer database (20); determining a consumer rating index variable (12) based upon a scoring formula (34) utilizing at least one data field from the provided data sets; and presenting the consumer rating index variable (12) to the credit issuer (28). A system (10) and apparatus (50) for rating the consumer in connection with this transaction is also disclosed.

49 Claims, 3 Drawing Sheets

U.S. PATENT DOCUMENTS

| | | | |
|---|---|---|---|
| 5,537,315 A | 7/1996 | Mitcham | |
| 5,793,028 A | 8/1998 | Wagener et al. | |
| 5,794,221 A | 8/1998 | Egendorf | |
| 5,870,721 A | 2/1999 | Norris | |
| 5,883,810 A | 3/1999 | Franklin et al. | |
| 5,940,811 A | 8/1999 | Norris | |
| 6,000,832 A | 12/1999 | Franklin et al. | |
| 6,029,150 A | 2/2000 | Kravitz | |
| 6,029,890 A | 2/2000 | Austin | |
| 6,032,136 A | 2/2000 | Brake, Jr. et al. | |
| 6,078,891 A | 6/2000 | Riordan et al. | |
| 6,098,053 A | 8/2000 | Slater | |
| 6,105,007 A | 8/2000 | Norris | |
| 6,122,624 A | 9/2000 | Tetro et al. | |
| 6,188,994 B1 | 2/2001 | Egendorf | |
| 6,202,053 B1 | 3/2001 | Christiansen et al. | |
| 6,227,447 B1 | 5/2001 | Campisano | |
| 6,289,319 B1 | 9/2001 | Lockwood | |
| 6,317,783 B1 | 11/2001 | Freishtat et al. | |
| 6,332,134 B1 | 12/2001 | Foster | |
| 6,341,724 B2 | 1/2002 | Campisano | |
| 6,351,739 B1 | 2/2002 | Egendorf | |
| 6,477,578 B1 | 11/2002 | Mhoon | |
| 6,505,171 B1 | 1/2003 | Cohen et al. | |
| 6,675,153 B1 | 1/2004 | Cook et al. | |
| 6,704,714 B1 | 3/2004 | O'Leary et al. | |
| 6,785,661 B1 | 8/2004 | Mandler et al. | |
| 6,820,202 B1 | 11/2004 | Wheeler et al. | |
| 6,839,690 B1 | 1/2005 | Foth et al. | |
| 6,839,692 B2 | 1/2005 | Carrott et al. | |
| 6,868,408 B1 | 3/2005 | Rosen | |
| 6,883,022 B2 | 4/2005 | Van Wyngarden | |
| 6,889,325 B1 | 5/2005 | Sipman et al. | |
| 6,915,272 B1 | 7/2005 | Zilliacus et al. | |
| 6,931,382 B2 | 8/2005 | Laage et al. | |
| 6,957,334 B1 | 10/2005 | Goldstein et al. | |
| 6,970,853 B2 | 11/2005 | Schutzer | |
| 6,976,008 B2 | 12/2005 | Egendorf | |
| 6,980,970 B2 | 12/2005 | Krueger et al. | |
| 7,006,986 B1 | 2/2006 | Sines et al. | |
| 7,051,001 B1 | 5/2006 | Slater | |
| 7,107,243 B1 | 9/2006 | McDonald et al. | |
| 7,177,836 B1 | 2/2007 | German et al. | |
| 7,263,506 B2 | 8/2007 | Lee et al. | |
| 7,406,436 B1 * | 7/2008 | Reisman | 705/10 |
| 7,406,442 B1 | 7/2008 | Kottmeier, Jr. et al. | |
| 2001/0034702 A1 | 10/2001 | Mockett et al. | |
| 2001/0034724 A1 | 10/2001 | Thieme | |
| 2002/0007302 A1 | 1/2002 | Work et al. | |
| 2002/0007341 A1 | 1/2002 | Lent et al. | |
| 2002/0032860 A1 | 3/2002 | Wheeler et al. | |
| 2002/0035538 A1 | 3/2002 | Moreau | |
| 2002/0052833 A1 | 5/2002 | Lent et al. | |
| 2002/0069166 A1 | 6/2002 | Moreau et al. | |
| 2002/0087467 A1 | 7/2002 | Mascavage, III et al. | |
| 2002/0099649 A1 | 7/2002 | Lee et al. | |
| 2002/0107793 A1 | 8/2002 | Lee | |
| 2002/0112160 A2 | 8/2002 | Wheeler et al. | |
| 2002/0120537 A1 | 8/2002 | Morea et al. | |
| 2002/0120864 A1 | 8/2002 | Wu et al. | |
| 2002/0156688 A1 | 10/2002 | Horn et al. | |
| 2002/0178071 A1 | 11/2002 | Walker et al. | |
| 2002/0198822 A1 | 12/2002 | Munoz et al. | |
| 2003/0036996 A1 | 2/2003 | Lazerson | |
| 2003/0061157 A1 | 3/2003 | Hirka et al. | |
| 2003/0120615 A1 | 6/2003 | Kuo | |
| 2003/0144952 A1 | 7/2003 | Brown et al. | |
| 2003/0200184 A1 | 10/2003 | Dominguez et al. | |
| 2003/0208420 A1 * | 11/2003 | Kansal | 705/34 |
| 2004/0030667 A1 * | 2/2004 | Xu et al. | 707/1 |
| 2004/0078328 A1 | 4/2004 | Talbert et al. | |
| 2004/0111362 A1 | 6/2004 | Nathans et al. | |
| 2004/0151292 A1 | 8/2004 | Larsen | |
| 2004/0162772 A1 * | 8/2004 | Lewis | 705/34 |
| 2004/0186807 A1 | 9/2004 | Nathans et al. | |
| 2005/0004870 A1 * | 1/2005 | McGaughey | 705/42 |
| 2005/0038715 A1 | 2/2005 | Sines et al. | |
| 2005/0071266 A1 | 3/2005 | Eder | |
| 2005/0080718 A1 * | 4/2005 | Desai | 705/38 |
| 2005/0125336 A1 | 6/2005 | Rosenblatt et al. | |
| 2005/0131808 A1 | 6/2005 | Villa | |
| 2005/0246278 A1 | 11/2005 | Gerber et al. | |
| 2006/0064372 A1 | 3/2006 | Gupta | |
| 2006/0106699 A1 | 5/2006 | Hitalenko et al. | |
| 2006/0184428 A1 | 8/2006 | Sines et al. | |
| 2006/0184449 A1 | 8/2006 | Eder | |
| 2006/0184570 A1 | 8/2006 | Eder | |
| 2006/0242039 A1 * | 10/2006 | Haggerty et al. | 705/35 |
| 2006/0266819 A1 | 11/2006 | Sellen et al. | |
| 2006/0289621 A1 | 12/2006 | Foss, Jr. et al. | |
| 2007/0005445 A1 | 1/2007 | Casper | |
| 2007/0250919 A1 | 10/2007 | Shull et al. | |
| 2007/0288375 A1 | 12/2007 | Talbert et al. | |
| 2008/0046334 A1 | 2/2008 | Lee et al. | |
| 2008/0052244 A1 | 2/2008 | Tsuei et al. | |

FOREIGN PATENT DOCUMENTS

| | | |
|---|---|---|
| EP | 0 829 813 A1 | 3/1998 |
| EP | 1223524 A2 | 7/2002 |
| WO | WO 88/10467 A1 | 12/1988 |
| WO | WO 00/02150 A1 | 1/2000 |
| WO | WO 00/67177 A2 | 11/2000 |

OTHER PUBLICATIONS

New System Will Give Retailers Instant Credit Checks; [All Editions.=.4 Star. 2 Star B. 2 Star P. 1 Star, , LateEarly] by Patricia Lamiell, The Associated Press. The Record. Bergen County, N.J.: Feb. 5, 1998. p. b.01.*

* cited by examiner

COMPUTER-IMPLEMENTED METHOD AND SYSTEM FOR DYNAMIC CONSUMER RATING IN A TRANSACTION

BACKGROUND OF THE INVENTION

1. Field of the Invention

The present invention relates generally to transaction systems and methods of assessing and rating a consumer engaging in the transaction and, in particular, to a computer-implemented method and system for rating a consumer dynamically and substantially when the transaction is initiated between the consumer and a merchant.

2. Description of Related Art

In order to enable convenient purchases of goods and services by consumers, the financial service industry has developed many alternative payment methods that allow a consumer to engage in a transaction and receive goods and services on credit. For example, such alternative payment methods may include checks, ATM or debit cards, credit cards, charge cards, etc. Prior to the birth of virtual commerce, as discussed below, such payment options provided adequate convenience and transactional security to consumers and merchants in the marketplace. While transactional security may include the security offered by a payment method to the consumer that the purchase event will not result in a breach of personal information, transactional security also offers the merchant or seller the security that fraud will not be perpetrated and that the consumer is not a credit risk.

Virtual commerce and the growth of the Internet as a medium for commerce have placed pressure on the payment options discussed above on both the convenience and transactional security and profitability by the credit issuer. For example, credit cards may be convenient to the consumer but are subject to fraudulent use via theft of the account number, expiration date and address of the consumer. This, in turn, places the credit issuer at risk of offering credit to an uncreditworthy consumer, being the subject of consumer fraud or issuing credit to a consumer in a situation that is otherwise unprofitable to the credit issuer.

Currently, available payment options include significant shortcomings when applied to remote purchasers, such as purchases where the buyer and the seller (that is, the merchant) are not physically proximate during the transaction. Specific examples of remote purchases are mail order, telephone order, Internet and wireless purchases. Further, regardless of the proximity, merchants and credit issuers alike continue to battle the problem of fraudulent purchases. Each new payment option and every new sales channel (in-store, telephone, mail and Internet) have, in turn, spawned innovation on the part of consumers willing to perpetrate fraud in order to obtain goods and services without paying for them.

In recent years, the birth of the Internet commerce industry and the continued growth in mail order and telephone order commerce have pushed the credit card to the forefront of these battles. Typically, merchants are forced to rely on credit cards because it is currently their only option in the remote purchase environment. However, regardless of the type of credit offered, low transactional security is offered to both merchants and consumers. This leads to significant cost for the consumers and the merchants, such as the consumer cost including the impairment of their credit record, the inconvenience of changing all of their credit card accounts and the financial costs in resolving the situation. Merchant costs may include the mitigation of fraud losses, including the cost of incremental labor, hardware and software to implement additional security checks in their sales/order entry software, higher transaction processing expense in the form of discount rates for credit cards and NSF fees for checks and higher fraud charge-offs for undetected fraudulent purchases.

Notwithstanding fraud risks, the credit issuer must take a "leap of faith" in issuing credit to an unknown or relatively unknown customer. Further, assessing a consumer's credit, fraud and profitability risk is performed using minimal information. For example, in the credit card industry, the merchant's "view" is not considered, with the only data considered being the amount of the transaction, the date and the merchant type. Therefore, limited credit assessment is conducted during the transaction. While the credit card industry may perform a more in-depth view of the consumer during the application process, there is no guarantee that the consumer has an increased credit risk at a later date, the credit account has been misappropriated by a third party, or the consumer profitability (affecting the terms of credit) is decreased at a subsequent transaction. This means that the credit card industry merely takes a static snapshot of the consumer, issues credit to the consumer and allows the consumption process to begin.

In the present industry, consumer rating or indexing, while possibly occurring, is technically limited. There is not enough data available to the rater in order to make an informed decision about the transaction in which the consumer is engaged. While some credit issuers have access to a preference engine, such an engine is batch operated, wherein information is gathered, loaded and periodically updated. Therefore, and again, the consumer, who is a dynamically variable credit risk, is only periodically assessed.

These drawbacks and shortcomings in the prior art result in several negative effects. For example, the credit issuer experiences increased financial losses due to their issuance of credit to a risky consumer. This, in turn, decreases consumer confidence in the credit issuer. Further, transactions that are unprofitable may be approved, and transactions that are profitable may be declined. Therefore, there remains a need for a more dynamic consumer rating and indexing system that overcomes these effects and drawbacks.

SUMMARY OF THE INVENTION

It is, therefore, an object of the present invention to provide a computer-implemented method and system for dynamic consumer rating in a transaction between a consumer and a merchant that overcomes the deficiencies of the prior art. It is another object of the present invention to provide a method and system for dynamic consumer rating in a transaction that uses additional and previously-unavailable information to determine a consumer index variable and, therefore, assess a consumer's credit risk, fraud risk and profitability. It is a still further object of the present invention to provide a method and system for dynamic consumer rating in a transaction that assesses the consumer on a transaction-by-transaction basis or in a substantially real-time format. It is yet another object of the present invention to provide a method and system for dynamic consumer rating in a transaction wherein the authorization of the consumer occurs at the point-of-sale.

The present invention is directed to a computer-implemented method of rating a consumer in connection with a transaction initiated by the consumer in requesting credit from a credit issuer. This method includes the steps of: (a) providing a merchant-based consumer/transaction data set including a plurality of data fields to a central credit issuer database; (b) providing a third party credit history data set including a plurality of data fields to a central credit issuer database; (c) providing a credit issuer credit history data set including a plurality of data fields to a central credit issuer database; (d) determining a consumer rating index variable based upon a scoring formula utilizing at least one data field value from at least one of the provided merchant-based consumer/transaction data set, the third party credit history data set and the credit issuer credit history data set; and (e) presenting the consumer rating index variable to the credit issuer. In addition, the computer-implemented method described above is initiated substantially at the same time the credit transaction is initiated. Therefore, the presently-invented method is performed in a real-time or dynamic process.

The present invention is also directed to an apparatus for rating a consumer in connection with a transaction initiated by the consumer and requesting credit from a credit issuer. The apparatus includes a storage mechanism having a central credit issuer database. In addition, the apparatus includes an input mechanism for transmitting a merchant-based consumer/transaction data set including a plurality of data fields, a third party credit history data set including a plurality of data fields and a credit issuer credit history data set including a plurality of data fields to the central credit issuer database. A processor mechanism determines a consumer rating index variable based upon a scoring formula utilizing at least one data field value from at least one of the provided merchant-based consumer/transaction data set, third party credit history data set and credit issuer credit history data set. The transmission of the merchant-based consumer/transaction data set, the third party credit history data set and the credit issuer credit history data set is initiated substantially at the time the credit transaction is initiated.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

Figure 1:
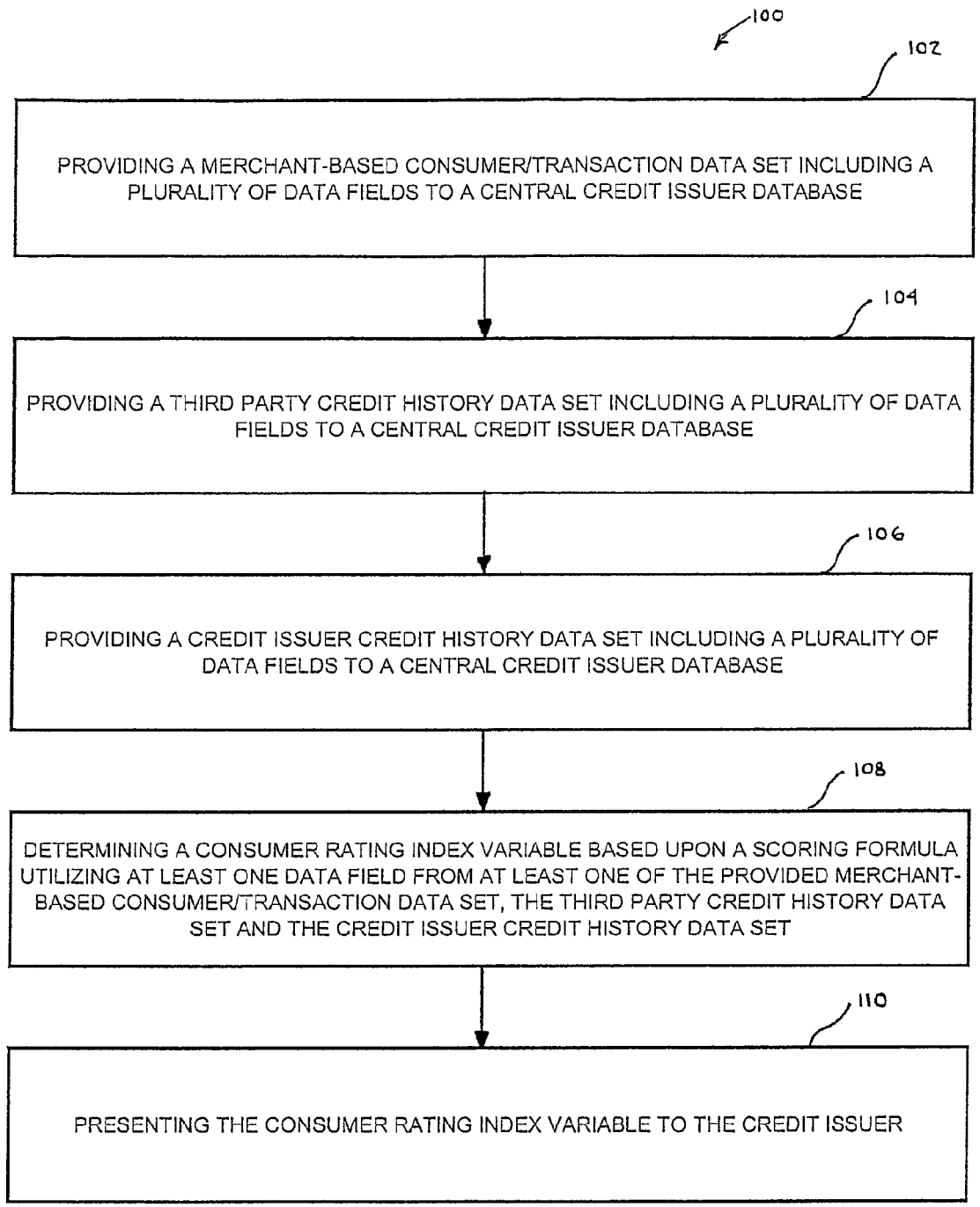
FIG. 1 is a flow diagram of a computer-implemented method for rating a consumer in a transaction between the consumer and a merchant according to the present invention.
Figure 2:
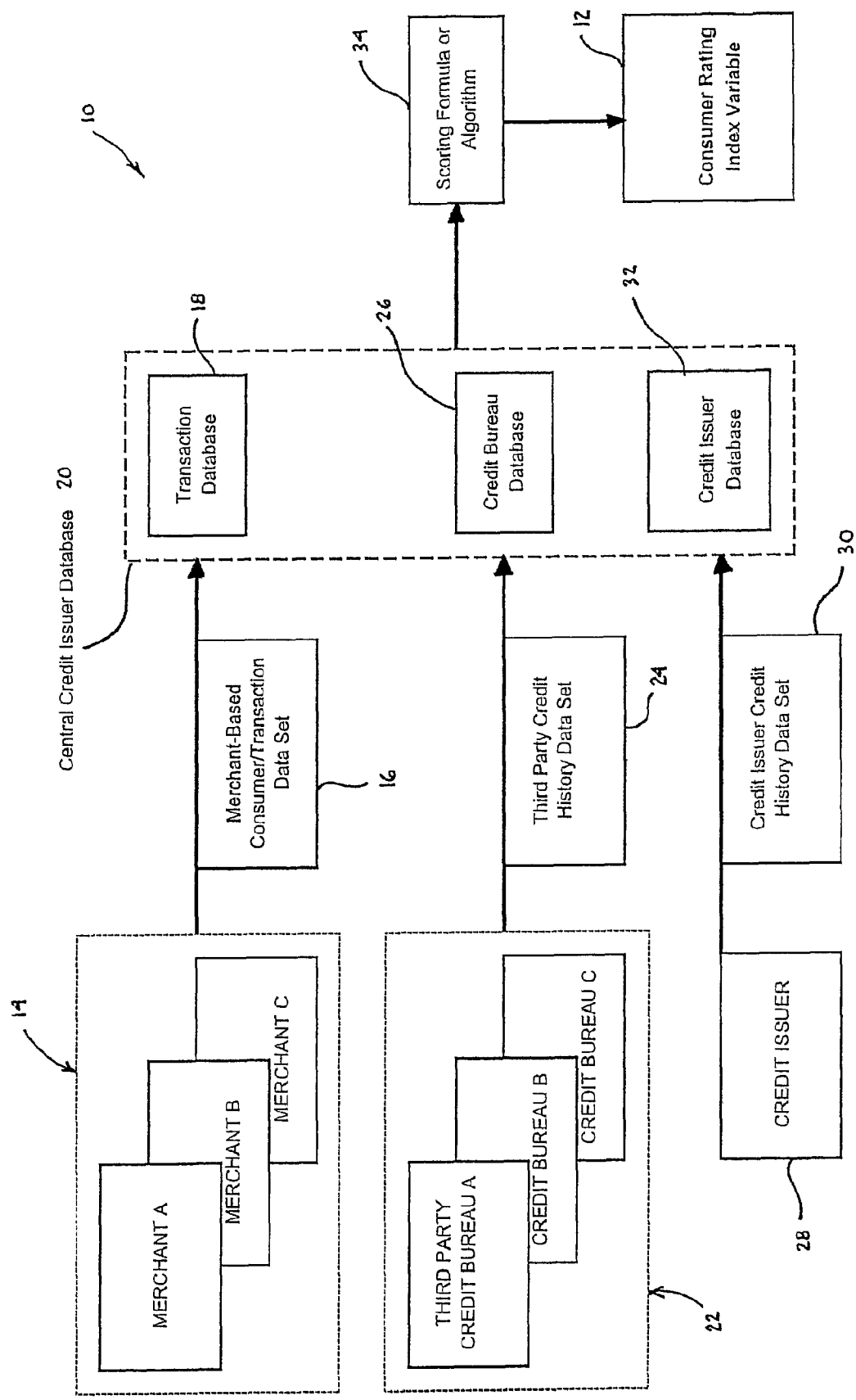
FIG. 2 is a schematic view of the method and system of FIG. 1.
Figure 3:
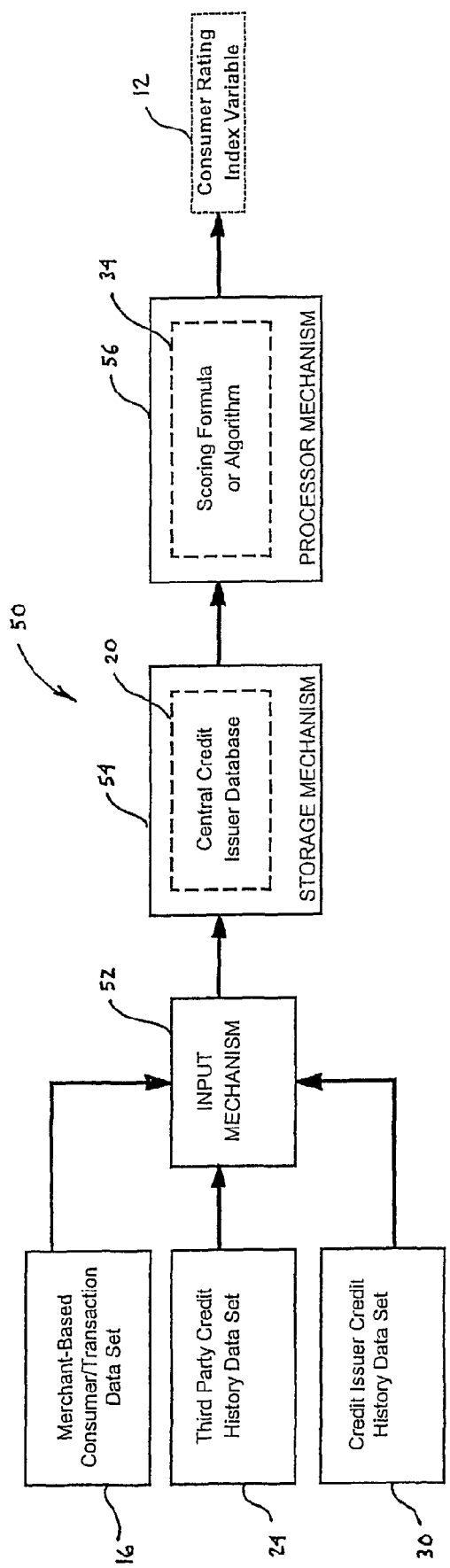
FIG. 3 is a schematic view of an apparatus for rating a consumer in connection with a transaction according to the present invention.

The present invention is directed to a computer-implemented method of rating a consumer in connection with a transaction initiated by the consumer, which requests credit from a credit issuer. The method of the present invention and a schematic view of the system are illustrated in FIGS. 1 and 2. The present invention is also directed to an apparatus for rating a consumer in connection with a transaction that is initiated by the consumer and requests credit from a credit issuer. Such an apparatus is illustrated in schematic form in FIG. 3.

According to the present invention, a method 100 is included for rating, scoring or indexing a consumer that is engaged in a transaction wherein the consumer is requesting credit from a credit issuer. According to this method 100, and in one preferred and non-limiting embodiment, the method 100 includes the steps of: providing a merchant-based consumer/transaction data set including a plurality of data fields to a central credit issuer database (Step 102); providing a third party credit history data set including a plurality of data fields to a central credit issuer database (Step 104); providing a credit issuer credit history data set including a plurality of data fields to a central credit issuer database (Step 106); determining a consumer rating index variable based upon a scoring formula utilizing at least one data field value from at least one of the provided merchant-based consumer/transaction data set, the third party credit history data set and the credit issuer credit history data set (Step 108); and presenting the consumer rating index variable to the credit issuer (Step 110). This method 100 of rating, scoring and/or indexing a consumer is initiated when the consumer initiates the credit transaction. Therefore, during or immediately after a credit transaction is engaged in by a consumer, the merchant (via the credit issuer) may be informed of any fraud or credit risk issues. In addition, the credit issuer can assess a consumer's profitability in deciding whether to authorize the transaction.

As seen in FIG. 2, the presently-invented method is employed in a system 10 that will provide the credit issuer with a consumer rating index variable 12 during or within a set or predetermined period after the transaction is engaged in by the consumer. Therefore, the method 100 and system 10 is initiated in a real-time transaction-by-transaction basis. In order to output or present the consumer rating index variable 12, certain information and data are required by the system 10. Specifically, in one preferred and non-limiting embodiment, three data sets are called upon for information or data.

The first data set is obtained from a merchant 14 and serves to initiate the credit request and transaction by the consumer. The data that is obtained from the merchant 14 is referred to as a merchant-based consumer/transaction data set 16, and this merchant-based consumer/transaction data set 16 includes a plurality of data fields that contain transaction and consumer information. For example, the merchant-based consumer/transaction data set may include the merchant's view, as well as the purchase demographic of the customer. Therefore, the data fields may include, but are not limited to, the transaction amount, the transaction date, the type of transaction, the product or service, shipping costs, delivery type, customer type or class, shipping address, consumer name, consumer status (such as new or return consumer), contact information, billing address and related transaction or consumer-specific data. This data, in the form of the merchant-based consumer/transaction data set 16 is transmitted from the merchant 14 to a transaction database 18 located on or within a central credit issuer database 20. The central credit issuer database 20 may be referred to as a data warehouse or central data collection medium that includes various subsets of data and secondary databases therein, such as the transaction database 18. Any database architecture is envisioned as is known in the art.

The system 10 also requires the input of information and data from a third party credit bureau 22. Specifically, the third party credit bureau 22 transmits a third party credit history data set 24 to a credit bureau database 26. As with the transaction database 18, the credit bureau database 26 is a subset of data or specified collection of data that is resident in the data warehouse referred to as the central credit issuer database 20. The third party credit history data set 24 includes the history of the consumer as is tracked and evaluated by the third party credit bureau 22. In order to obtain such data, certain information may be transmitted from the system 10 to the third party credit bureau 22, such as customer demographical data or other identification information required by the third party credit bureau 22 to issue its report or opinion. As is known in the art, the third party credit bureau 22 maintains its own database of information for the purposes of verification and authentication of a consumer wishing to obtain credit in one or more transactions.

Finally, a credit issuer 28 transmits certain data and information to the central credit issuer database 20. Specifically, the credit issuer 28 transmits a credit issuer credit history data set 30 to a credit issuer database 32, which is also resident in the central credit issuer database 20. It is specifically envisioned that, in this preferred and non-limiting embodiment, the credit issuer credit history data set 30 may be transmitted to the credit issuer database 32 in an electronic format via a network or similar system. However, the information in the credit issuer credit history data set 30 may already be resident in the credit issuer database 32 in the central credit issuer database 20, as directly transmitted during previous transactions and sales. Therefore, the credit issuer credit history data set 30 may not require specific transmission, but may already be available as part of the data warehouse referred to as the central credit issuer database 20. The data in the credit issuer credit history data set 30 refers to the credit issuer's 28 historical data and is useful in rating or scoring a transaction risk. For example, such data may include how the consumer pays the bill, how long the consumer has been an account, the account balance, the shipping address history, the merchant history, etc.

Once the central credit issuer database 20 has obtained the necessary information regarding the consumer, the transaction and the consumer's credit on the transaction database 18, the credit bureau database 26 and the credit issuer database 32, the necessary information and data are transmitted to and utilized by a scoring formula 34, which is typically in the form of an algorithm. A scoring formula operates on the data, using one or more data field values from the provided merchant-based consumer/transaction data set 16, the third party credit history data set 24 and/or the credit issuer credit history data set 30. Finally, the system provides the consumer rating index variable 12 to the credit issuer 28 for use in the decision-making process revolving around the transaction and/or the consumer.

The consumer rating index variable 12 may be a number in a scale, a color, a description or other indication that helps and assists in scoring, rating and indexing a consumer. For example, the consumer rating index variable 12 may provide an indication as to whether the consumer is a credit risk in this specific transaction. Further, the consumer rating index variable 12 may indicate whether the consumer is a fraud risk, such that the merchant 14 should take additional measures to identify, authorize and verify the consumer and the intended transaction. The consumer rating index variable 12 may also be a customer revenue index, which is directed to the consumer's net present value and profitability, which assists in making the decision regarding a specific transaction that is engaged in. Still further, as discussed in detail hereinafter, the consumer rating index variable 12 may be a value on a scale from 200 through 800, which is a standard credit bureau scale for rating a consumer.

In one preferred and non-limiting embodiment, the following algorithms or scoring and rating formulae are utilized to determine the consumer rating index variable 12 for use in scoring a customer and further use in connection with the billing/credit issuance process. Further, the resulting consumer rating index variable may be used to determine whether to extend additional credit to an existing consumer. In this preferred and non-limiting embodiment, the process for determining the consumer rating index variable 12 includes the steps of: (i) Population Selection (select the appropriate development population); (ii) Variable Computation (build the candidate predictors/response variables); (iii) CHAID Analysis (perform segmentation analysis to identify homogeneous segments); (iv) Regression Analysis (build score cards); and (v) Validation Analysis (validating scorecards against a validation sample).

Population Selection

Each scoring algorithm rates a consumer at a specific point in the lending process. Accordingly, population selection populates the scoring algorithms with the actual data and the raw variables. All observations that satisfy the following criteria are included in the score development: (a) an account number already exists, i.e., people who have been approved at least once; (b) Authorization Response Codes=0, 20, 110, 108 (internal codes indicative of approvals and declinations); and (c) all authorizations since the earliest reliable database population. Only the first and second authorizations are selected for each account from the above population. The data set is then collapsed to account level by taking the first authorizations for each account and the new computed variables.

Variable Computation

Variable computation is used to determine whether the data requires further modification and whether there is "missing" data that requires emulation. The following data fields and variables may be used in one preferred and non-limiting embodiment of the present invention.

Amt.1=amount of first authorization

Amt.2=amount of second authorization

Mrchchck=1 if different merchants, 0 otherwise

Timedif=hours between first and second authorizations

Amtbydif=second transaction amount/(timedif+1)

Btstchck=1 if first and second authorization have same bill-to and ship-to addresses the same 2 if first authorization has the same and second has a different address 3 if first authorization was different and second was the same 4 if both first and second authorization were both different rescpcd.1=auth response code on first authorization (approved, declined, etc.)

rescpcd.2=auth response code on second authorization dlqstr=1 if the third character from right of payment activity history code=2, C, K or S 0 (internal codes for billing and delinquency indicator) otherwise:

Resp2nd="app" if there are approvals in both first and second auth.

Resp2nd="dec" if there is approval in first auth and decline in the second auth.

CHAID Analysis

The sample is then analyzed for segments with unique causative relationships to the response variables using an analytical/statistical segmentation method. Homogeneous segments are identified to ensure that the consumer is in the same population segment, e.g., "good" credit, credit risk, no credit data, etc. Segments were found that were defined by: (a) Num Actv Trds (the number of active trades in the credit bureau report); (b) FICO (the FICO score of the customer at acquisition); and (c) Credit Segment (the credit issuer defined credit segment for the customer).

Regression Analysis

Regression is performed on all segments identified in the CHAID analysis in order to build the score card for consumer rating. Given below are the Forward Step Logistic Regression equations and the corresponding calculated deciles for each of the above segments:

Segment 1: (Num-Actv 3 through 12 inclusive)

logit=f''(number_active_bc, num_pub, num_tr1, num_tr3, webmoto, fic, amt.2, timedif, amtratio)

Where:
Number_active_bc is number of active bankcards from the credit bureau
Num_pub is the number of public records found in the credit bureau
Num_tr1 is the number of trade in the credit bureau
Num_tr3 is the number of 90+Days Past Due trade in the credit bureau
Webmoto is an indicator of whether the sale was made on the web or by telephone
Fic is the FICO score
Amt.2 is the second transaction amount
Timedif is the elapsed time between first and second authorizations
Amtratio is the ratio of the first second authorization amount to the first authorization amount Segment 1—The rows move from riskiest to most credit worthy. The ProbUpper column is a measure of the chance that the consumer will default, and the Badcount is the number of defaults in the population.

| Interval ProbUpper | ProbLower | Badcount | No. of observations | % bad |
|---|---|---|---|---|
| 0.50 | 0.09 | 162.00 | 1107.00 | 0.14634 |
| 0.09 | 0.07 | 84.00 | 1107.00 | 0.07588 |
| 0.07 | 0.06 | 69.00 | 1107.00 | 0.06233 |
| 0.06 | 0.05 | 54.00 | 1107.00 | 0.04878 |
| 0.05 | 0.04 | 46.00 | 1107.00 | 0.04155 |
| 0.04 | 0.03 | 33.00 | 1107.00 | 0.02981 |
| 0.03 | 0.02 | 25.00 | 1107.00 | 0.02258 |
| 0.02 | 0.01 | 4.00 | 1107.00 | 0.00361 |
| 0.01 | 0.01 | 7.00 | 1107.00 | 0.00632 |
| 0.01 | 0.00 | 15.00 | 1120.00 | 0.01339 |
|  |  | 499.00 | 11083.00 | 0.04502 |

Validation

The model was validated by running Forward step logistics and calculating deciles with a 30% randomly selected validation sample from the original population selected. The results are shown below:

| Full Sample Validation Development | | |
|---|---|---|
| 100% | 30% | 70% |
| 14.63 | 16.22 | 14.97 |
| 7.59 | 11.11 | 7.61 |
| 6.23 | 6.61 | 8.00 |
| 4.88 | 3.90 | 4.39 |
| 4.16 | 3.00 | 4.39 |
| 2.98 | 5.11 | 2.71 |
| 2.26 | 1.20 | 1.55 |
| 0.36 | 0.90 | 0.39 |
| 0.63 | 0.30 | 0.65 |
| 1.34 | 0.60 | 1.16 |
| 4.50 | 4.89 | 4.58 |

Next, the credit score for the consumer is placed on a common scale in order to achieve homogenous models in standardized form. The Logit output from the regression analysis is standardized, whereby the Logit output of the equation is then used to estimate a raw score. The raw score represents the probability estimate of the outcome. In one embodiment, the equation to calculate the raw score is:

$$\text{Raw score(predicted probability)}=1/(1+\exp(-\log\text{-odds}))$$

The raw score must then be normalized across all the score cards so that a common score value represents the same probability of outcome for all transactions. The normalized score can be scaled in a variety of ways. In one preferred and non-limiting embodiment, the scale chosen uses a range of 200 through 800, where increasing score values are associated with declining risk. The normalization function is as follows:

$$\text{Normalized Score}=\text{MAX}(800-(\text{MAX}((\text{raw score}-0.008),0)/0.008)*40,200)$$

In one example of a score calculation:

| Csp_acct_num | 5049902000187250 |
|---|---|
| Btstchck* | 4 |
| credit_seg** | 5 |
| fic | 713 |
| num_actv | 4 |
| num_pub_ | 0 |
| num_tr1 | 0 |
| num_tr2 | 0 |
| num_trds | 0 |
| timedif | 4 |

*btstchck = 4 ➔ btstchck1 = 0, btstchck2 = 0, btstchck1 = 0.
**credit_seg = 5 ➔ Only credit_seg8 = 1 all other credit_seg variables are equal to zero.

Log-odds=−17.07663026014810000+
18.15223211620720000*0+19.13745662712380000*0+
18.19283426855700000*0+17.92906512795210000*0+
16.83431847451940000*0+17.80790829621750000*0−
14.21707572866670000*0+19.23480342409850000*11+
9.35819328266010000*0+1.53416212574188000*0+
0.82791562577957700*0__−0.02418540185459180*4+
0.56219566758910400*0+1.43309613496916000*0−
0.00503720355200225*713−0.21189108069530000*0+
0.50199963103629900*0−0.07318126871833160*0−
0.02784999889928590*4=−1.64149457164272

Raw score=1/(1+exp(1.64149457164272))=
0.162261798547613

$$\text{Normalized Score} = \text{MAX}(800 - (\text{MAX}((\text{raw score} - 0.008), 0)/0.008)*40,200)$$

$$= 200$$

The normalized score is based on the following scale:

| Maximum score | 800.0 |
|---|---|
| Minimum score | 200.0 |
| Decrease in score per 0.008 increase in raw score | 40.0 |

In this manner, the consumer rating index variable 12 is presented to the credit issuer 28 for use in determining whether to issue credit to the consumer. By using the scale of 200-800 (with 800 being the most credit worthy), the credit issuer 28 can decide whether to extend credit during the transaction process. The use of the 200-800 scale is rooted in the generic credit bureau scaling system well known in the art. Further, a consumer rating index variable 12 provided as a value on this scale will ensure that the credit issuer 28 makes an appropriate credit decision.

In another preferred and non-limiting embodiment, the present invention is also directed to an apparatus 50 for rating a consumer in connection with a transaction initiated by the consumer. Again, the transaction involves the consumer or merchant requesting credit from the credit issuer 28. The apparatus includes an input mechanism 52 for receiving and transmitting the merchant-based consumer/transaction data set 16, the third party credit history data set 24 and the credit issuer credit history data set 30 from the sources to a storage mechanism 54. The storage mechanism 54 includes the central credit issuer database 20, which serves as the data warehouse for the information and data gathered through the input mechanism 52. Again, it is envisioned that the credit issuer credit history data set 30 may already be resident within or in communication with the storage mechanism 54 and the central credit issuer database 20.

Dependent upon the scoring, rating or indexing of the consumer that is desired, the appropriate data field values are collected from one or more of the merchant-based consumer/transaction data set 16, the third party credit history data set 24 and/or the credit issuer credit history data set 30. This information is transmitted to and received by a processor mechanism 56, and the processor mechanism 56 includes the scoring formula 34 or algorithm as part of its functionality and processing capability. Specifically, the processor mechanism 56 determines the consumer rating index variable 12 based upon the scoring formula 34, which uses data field values from the data sets (16, 24, 30). After the consumer rating index variable 12, whether in numeric, alphanumeric or other form, the processor mechanism 56 transmits the consumer rating index variable 12 to the credit issuer 28. The transmission of the data sets (16, 24, 30) is initiated substantially at the same time the credit transaction is initiated.

In this manner, the present invention is directed to a computer-implemented method 100, system 10 and apparatus 50 that overcomes the deficiencies of the prior art. The present invention receives, processes and otherwise considers a much larger amount of data than prior art systems, thus allowing the present invention to provide a more accurate consumer rating index variable 12. Therefore, the present invention initiates the method 100 on a real-time transaction-by-transaction basis, as opposed to prior art systems that use preference engines operating on batch data on a periodic basis. Therefore, the present invention ensures that transactions that should have been approved are approved and transactions that should be declined are declined. This leads to decreased financial losses due to credit risk and fraud. Since the analysis of the present method 100 occurs while the transactions are occurring, the present invention provides a method 100, system 10 and apparatus 50 that is a point-of-sale consumer authorization tool. If a specific transaction requires more information, and since the present method 100 is performed in a real-time basis, the credit issuer 28 can notify the merchant 14 at the point-of-sale to request additional information or verification of information from the consumer. This, in turn, also helps to reduce the instances of issuing credit to a credit risk or having fraud perpetrated on the credit issuer 28.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A method of rating a consumer in connection with a transaction initiated by the consumer with a merchant and requesting credit from a credit issuer not associated with the merchant, comprising the steps of:
   providing at least one digital computer, and using the at least one digital computer:
   (a) providing a merchant-based consumer/transaction data set including a plurality of data fields to a central credit issuer database;
   (b) providing a third party credit history data set including a plurality of data fields to a central credit issuer database;
   (c) providing a credit issuer credit history data set including a plurality of data fields to a central credit issuer database;
   (d) determining a consumer rating index variable based upon a scoring formula utilizing at least one data field value from at least one of the provided merchant-based consumer/transaction data set, the third party credit history data set and the credit issuer credit history data set; and,
   (e) presenting the consumer rating index variable to the credit issuer,
   wherein the method is initiated substantially at the time the credit transaction is initiated.

2. The method of claim 1, wherein the at least one digital computer comprises a personal computer, a networked device, a laptop, a palmtop, a personal digital assistant or a server.

3. The method of claim 1, wherein the consumer/transaction data set includes at least one field populated with data reflecting at least one of a consumer's name, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type and customer type.

4. The method of claim 1, wherein the third party credit history data set includes at least one field populated with data reflecting a consumer's name, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type, customer type, a company identity, a merchant identity, a third party risk score, a general credit risk score, a credit bureau risk score, a prior approval, prior report data, previous transaction data, a geographical risk factor, credit account data, bankcard balance data, delinquency data, credit segment data, time between transactions data, previous transaction amount, previous transaction approval status, previous transaction time stamp data, a response code, active trades in database, public record data, trade line data, transaction medium and credit segment data.

5. The method of claim 1, wherein the credit issuer credit history data set includes at least one field populated with data reflecting a consumer's name, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type, customer type, a company identity, a merchant identity, a third party risk score, a general credit risk score, a credit bureau risk score, a prior approval, prior report data, previous transaction data, a geographical risk factor, credit account data, bankcard balance data, delinquency data, credit segment data, time between transactions data, previous transaction amount, previous transaction approval status, previous transaction time stamp data, a response code, active trades in database, public record data, trade line data, transaction medium, credit segment data, consumer payment type, consumer payment method, consumer payment history, consumer account history, consumer credit account balance and merchant history.

6. The method of claim 1, wherein the central credit issuer database includes at least one sub-database containing at least one field therein.

7. The method of claim 6, wherein the central credit issuer database includes at least one of:
(i) a transaction database including at least one field populated by data reflecting at least one of transaction data and consumer data;
(ii) a verification database including at least one field populated by data reflecting at least one of verification data and third party credit history data; and,
(iii) a credit issuer database including at least one field populated by data reflecting at least one of credit issuer data and credit issuer credit history data.

8. The method of claim 1, wherein the consumer/transaction data set is provided to the central credit issuer database from a merchant.

9. The method of claim 1, wherein the third party credit history data set is provided to the central credit issuer database from a third party credit bureau.

10. The method of claim 1, wherein the credit issuer credit history data set is provided to the central credit issuer database from a credit issuer.

11. The method of claim 1, further comprising the step of providing an indicator to at least one of a user and a credit issuer, the indicator based upon the determined consumer rating index variable.

12. The method of claim 11, wherein the indicator is at least one of:
(i) a visual indicator that is at least one of a letter, a symbol, a term, a word, a phrase, a number, a color, a picture and a visual representation; and,
(ii) an audio indicator that is at least one of a sound, an alarm, an audio file, a digital sound and an analog sound.

13. The method of claim 1, wherein step (d) further includes the steps of:
(i) selecting the appropriate development population;
(ii) building a variable data set with data from at least one of the provided merchant-based consumer/transaction data set, the third party credit history data set and the credit issuer credit history data set;
(iii) performing segmentation analysis to identify homogeneous segments;
(iv) building a score card using regression analysis; and,
(v) validating the score card against a validation sample.

14. The method of claim 13, wherein data that meets specified and predetermined criteria are included in the selected population.

15. The method of claim 13, wherein the variable data set includes data reflecting at least one of amount of a first transaction, amount of a second transaction, merchant identity, time between transactions, bill-to address, addressee, authorization response, approval status, declination status, internal billing code and delinquency indicator.

16. The method of claim 13, wherein homogeneous segments are identified by analyzing data reflecting at least one of number of active trades, FICO score and defined credit segment.

17. The method of claim 13, wherein the regression analysis is a Forward Step Regression Analysis.

18. The method of claim 13, wherein the regression analysis is performed for each segment, wherein:

$$\text{logit}=f''(\text{number\_active\_bc}, \text{num\_pub}, \text{num\_tr1}, \text{num\_tr3}, \text{webmoto}, \text{fic}, \text{amt.2}, \text{timedif}, \text{amtratio}),$$

where:
number_active_bc is number of active bankcards from the credit bureau;
num_pub is the number of public records found in the credit bureau;
num_tr1 is the number of trade in the credit bureau;
num_tr3 is the number of 90+Days Past Due trade in the credit bureau;
webmoto is an indicator of whether the sale was made on the web or by telephone;
fic is the FICO score;
amt.2 is the second transaction amount;
timedif is the elapsed time between first and second authorizations; and,
amtratio is the ratio of the first second authorization amount to the first authorization amount.

19. The method of claim 18, wherein a raw score is calculated using the following formula: Raw Score (predicted probability)=$1/(1+\exp(-\log\text{-odds}))$.

20. The method of claim 19, wherein a normalized score is calculated using the following formula: Normalized Score=MAX(800−(Max((Raw Score−0.008, 0)/0.008)*40, 200).

21. The method of claim 13, wherein the consumer rating index variable is a normalized score in the range of 200 to 800.

22. The method of claim 13, wherein the validation analysis includes the step of calculating deciles with a 30% randomly selected validation sample from an original population selection.

23. The method of claim 1, wherein the consumer rating index variable is a normalized score in the range of 200 to 800.

24. The apparatus of claim 1, wherein the processor mechanism is further configured to provide an indicator to at least one of a user and a credit issuer, the indicator based upon the determined consumer rating index variable.

25. The apparatus of claim 24, wherein the indicator is at least one of:
(i) a visual indicator that is at least one of a letter, a symbol, a term, a word, a phrase, a number, a color, a picture and a visual representation; and,
(ii) an audio indicator that is at least one of a sound, an alarm, an audio file, a digital sound and an analog sound.

26. An apparatus for rating a consumer in connection with a transaction initiated by the consumer with a merchant and requesting credit from a credit issuer not associated with the merchant, the apparatus comprising:
a storage mechanism including a central credit issuer database;
an input mechanism for transmitting a merchant-based consumer/transaction data set including a plurality of data fields, a third party credit history data set including a plurality of data fields and a credit issuer credit history data set including a plurality of data fields to the central credit issuer database; and, a processor mechanism configured to determine a consumer rating index variable based upon a scoring formula utilizing at least one data field value from at least one of the provided merchant-based consumer/transaction data set, the third party credit history data set and the credit issuer credit history data set, wherein the transmission of the merchant-based consumer/transaction data set, the third party credit history data set and the credit issuer credit history data set is initiated substantially at the time the credit transaction is initiated.

27. The apparatus of claim 26, wherein the processor mechanism is a computing device.

28. The apparatus of claim 27, wherein the computing device is at least one of a personal computer, a networked device, a laptop, a palmtop, a personal digital assistant and a server.

29. The apparatus of claim 26, wherein the input mechanism is at least one of a direct-input device, a keyboard, a transmission device, a modem, a network and the Internet.

30. The apparatus of claim 26, wherein the consumer/transaction data set includes at least one field populated with data reflecting at least one of a consumer's name, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type and customer type.

31. The apparatus of claim 26, wherein the third party credit history data set includes at least one field populated with data reflecting a consumer's name, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type, customer type, a company identity, a merchant identity, a third party risk score, a general credit risk score, a credit bureau risk score, a prior approval, prior report data, previous transaction data, a geographical risk factor, credit account data, bankcard balance data, delinquency data, credit segment data, time between transactions data, previous transaction amount, previous transaction approval status, previous transaction time stamp data, a response code, active trades in database, public record data, trade line data, transaction medium and credit segment data.

32. The apparatus of claim 26, wherein the credit issuer credit history data set includes at least one field populated with data reflecting a consumer's name, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type, customer type, a company identity, a merchant identity, a third party risk score, a general credit risk score, a credit bureau risk score, a prior approval, prior report data, previous transaction data, a geographical risk factor, credit account data, bankcard balance data, delinquency data, credit segment data, time between transactions data, previous transaction amount, previous transaction approval status, previous transaction time stamp data, a response code, active trades in database, public record data, trade line data, transaction medium, credit segment data, consumer payment type, consumer payment apparatus, consumer payment history, consumer account history, consumer credit account balance and merchant history.

33. The apparatus of claim 26, wherein the central credit issuer database includes at least one sub-database containing at least one field therein.

34. The apparatus of claim 33, wherein the central credit issuer database includes at least one of:
(i) a transaction database including at least one field populated by data reflecting at least one of transaction data and consumer data;
(ii) a verification database including at least one field populated by data reflecting at least one of verification data and third party credit history data; and,
(iii) a credit issuer database including at least one field populated by data reflecting at least one of credit issuer data and credit issuer credit history data.

35. The apparatus of claim 26, wherein the consumer/transaction data set is provided to the central credit issuer database from a merchant.

36. The apparatus of claim 26, wherein the third party credit history data set is provided to the central credit issuer database from a third party credit bureau.

37. The apparatus of claim 26, wherein the credit issuer credit history data set is provided to the central credit issuer database from a credit issuer.

38. The apparatus of claim 26, wherein the processor mechanism is further configured to:
(i) select the appropriate development population;
(ii) build a variable data set with data from at least one of the provided merchant-based consumer/transaction data set, the third party credit history data set and the credit issuer credit history data set;
(iii) perform segmentation analysis to identify homogeneous segments;
(iv) build a score card using regression analysis; and,
(v) validate the score card against a validation sample.

39. The apparatus of claim 38, wherein data that meets specified and predetermined criteria are included in the selected population.

40. The apparatus of claim 38, wherein the variable data set includes data reflecting at least one of amount of a first transaction, amount of a second transaction, merchant identity, time between transactions, bill-to address, addressee, authorization response, approval status, declination status, internal billing code and delinquency indicator.

41. The apparatus of claim 38, wherein homogeneous segments are identified by analyzing data reflecting at least one of number of active trades, FICO score and defined credit segment.

42. The apparatus of claim 38, wherein the regression analysis is a Forward Step Regression Analysis.

43. The apparatus of claim 38, wherein the regression analysis is performed for each segment, wherein:

$$\text{logit} = f(\text{number\_active\_bc}, \text{num\_pub}, \text{num\_tr1},$$
$$\text{num\_tr3}, \text{webmoto}, \text{fic}, \text{amt.2}, \text{timedif}, \text{amtratio}),$$

where:
- number_active_bc is number of active bankcards from the credit bureau;
- num_pub is the number of public records found in the credit bureau;
- num_tr1 is the number of trade in the credit bureau;
- num_tr3 is the number of 90+Days Past Due trade in the credit bureau;
- webmoto is an indicator of whether the sale was made on the web or by telephone;
- fic is the FICO score;
- amt.2 is the second transaction amount;
- timedif is the elapsed time between first and second authorizations; and,
- amtratio is the ratio of the first second authorization amount to the first authorization amount.

44. The apparatus of claim 43, wherein a raw score is calculated using the following formula: Raw Score (predicted probability)=1/(1+exp(−log-odds)).

45. The apparatus of claim 44, wherein a normalized score is calculated using the following formula: Normalized Score=MAX(800−(Max((Raw Score−0.008, 0)/0.008)*40, 200).

46. The apparatus of claim 38, wherein the consumer rating index variable is a normalized score in the range of 200 to 800.

47. The apparatus of claim 38, wherein the validation analysis includes the step of calculating deciles with a 30% randomly selected validation sample from an original population selection.

48. The apparatus of claim 26, wherein the consumer rating index variable is a normalized score in the range of 200 to 800.

49. An apparatus for rating a consumer in connection with a transaction initiated by the consumer and requesting credit from a credit issuer, the apparatus comprising:
- means for providing a merchant-based consumer/transaction data set including a plurality of data fields to a central credit issuer database;
- means for providing a third party credit history data set including a plurality of data fields to a central credit issuer database;
- means for providing a credit issuer credit history data set including a plurality of data fields to a central credit issuer database;
- means for determining a consumer rating index variable based upon a scoring formula utilizing at least one data field value from at least one of the provided merchant-based consumer/transaction data set, the third party credit history data set and the credit issuer credit history data set; and,
- means for presenting the consumer rating index variable to the credit issuer,
- wherein the provision of the merchant-based consumer/transaction data set, the third party credit history data set and the credit issuer credit history data set occurs substantially at the time the credit transaction is initiated.

* * * * *